US012801253B2

(12) United States Patent
Wang et al.

(10) Patent No.: US 12,801,253 B2
(45) Date of Patent: Nov. 17, 2026

(54) TOUCH DISPLAY MODULE AND TOUCH DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Zhiqiang Wang, Beijing (CN); Guiyu Zhang, Beijing (CN); Junhan Zhu, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 20 days.

(21) Appl. No.: 18/997,038

(22) PCT Filed: Apr. 16, 2024

(86) PCT No.: PCT/CN2024/087990

§ 371 (c)(1),
(2) Date: Jan. 18, 2025

(87) PCT Pub. No.: WO2024/244730

PCT Pub. Date: Dec. 5, 2024

(65) Prior Publication Data

US 2026/0140594 A1 May 21, 2026

(30) Foreign Application Priority Data

May 31, 2023 (CN) ........................ 202310637374.3

(51) Int. Cl.
*G06F 3/047* (2006.01)
*G06F 3/041* (2006.01)

(52) U.S. Cl.
CPC ............ *G06F 3/047* (2013.01); *G06F 3/0412* (2013.01); *G06F 3/04164* (2019.05)

(58) Field of Classification Search
CPC ..... G06F 3/047; G06F 3/04164; G06F 3/0412
See application file for complete search history.

(56) References Cited

U.S. PATENT DOCUMENTS

2014/0092041 A1* 4/2014 Ih .......................... G06F 3/0412 345/173
2021/0191555 A1* 6/2021 Jo ........................ G09G 3/3674

FOREIGN PATENT DOCUMENTS

CN 114510901 A 5/2022

* cited by examiner

*Primary Examiner* — Kwang-Su Yang
(74) *Attorney, Agent, or Firm* — BROOKS KUSHMAN P.C.

(57) ABSTRACT

A touch display module, including: a touch panel including a plurality of first touch lines and a plurality of second touch lines; a touch driving circuit board, a touch IC and a plurality of first leads being arranged on the touch driving circuit board; a first flexible circuit board, a plurality of second leads being arranged on the first flexible circuit board, a first compensation line being arranged at a side where the plurality of second leads is located; and a second flexible circuit board, a third lead being arranged on the second flexible circuit board. The present disclosure further provides a touch display device.

20 Claims, 11 Drawing Sheets

TOUCH DISPLAY MODULE AND TOUCH DISPLAY DEVICE

CROSS-REFERENCE TO RELATED APPLICATIONS

This application is the U.S. national phase of PCT Application No. PCT/CN2024/087990 filed on Apr. 16, 2024, which claims priority to Chinese Patent Application No. 202310637374.3 filed on May 31, 2023, which are incorporated herein by reference in their entireties.

TECHNICAL FIELD

The present disclosure relates to the manufacture of a touch display product, in particular to a touch display module and a touch display device.

BACKGROUND

The user's requirement on a touch specification of a touch display device becomes higher and higher. For example, a linearity of an active pen of a tablet computer is increased from Pen Linearity≤1.2 mm to Pen Linearity≤0.09 mm. Due to an increase in the performance specification of the active pen, not only a hardware capability and an algorithm processing capability of a touch Integrated Circuit (IC) but also specifications of a touch panel itself, e.g., raw capacitance uniformity, are highly demanded.

SUMMARY

An object of the present disclosure is to provide a touch display module and a touch display device, so as to solve the problem that the touch accuracy is adversely affected due to a difference between capacitances of touch lines extending at different sides in a case that the touch lines of a same kind extending from two sides.

In order to achieve the above object, the present disclosure provides the following technical solutions.

In one aspect, the present disclosure provides in some embodiments a touch display module, including: a touch panel, a first binding region and a second binding region being arranged at two opposite ends of the touch panel in a first direction, the first binding region and the second binding region being both arranged at a backlight side of the touch panel, the touch panel including a plurality of first touch lines and a plurality of second touch lines, ones of the plurality of first touch lines and the plurality of second touch lines including a plurality of first sub-touch lines curved and extending to the first binding region and a plurality of second sub-touch lines curved and extending to the second binding region; a touch driving circuit board, a touch IC being arranged on the touch driving circuit board, a plurality of first leads corresponding to the plurality of first sub-touch lines being arranged on the touch driving circuit board; a first flexible circuit board, one end of the first flexible circuit board being bound to the second binding region, the other end of the first flexible circuit board being bound to the touch driving circuit board, a plurality of second leads corresponding to the plurality of second sub-touch lines being arranged on the first flexible circuit board so that the plurality of second sub-touch lines is coupled to the touch IC, a first compensation line being further arranged on the first flexible circuit board, the first compensation line being arranged at a side where the plurality of second leads is located in a second direction perpendicular to the first direction, the first compensation line and the second leads being arranged side by side, one end of the first compensation line being coupled to a corresponding first sub-touch line via the touch driving circuit board; and a second flexible circuit board, one end of the second flexible circuit board being bound to the first binding region, the other end of the second flexible circuit board being coupled to the touch driving circuit board, a third lead corresponding to each first sub-touch line being arranged on the second flexible circuit board, and each first sub-touch line being coupled to the touch IC via the third lead and the corresponding first lead on the touch driving circuit board.

In a possible embodiment of the present disclosure, in the first direction, the plurality of first sub-touch lines includes a first line arranged proximate to the second binding region, and the plurality of second sub-touch lines includes a second line arranged proximate to the first binding region. The plurality of first leads includes a first sub-lead corresponding to the first line, the plurality of second leads includes a second sub-lead corresponding to the second line, the first compensation line is arranged proximate to the second sub-lead, and the first compensation line is coupled to the first sub-lead.

In a possible embodiment of the present disclosure, there is a gap between the first compensation line and the second binding region.

In a possible embodiment of the present disclosure, in the second direction, there are at least two second binding regions spaced apart from each other, the second sub-lead at least includes a first connection section, a second connection section and a third connection section, one end of the second connection section is coupled to one of the second binding regions, one end of the third connection section is coupled to one of the second binding regions, the other end of the second connection section and the other end of the third connection section are coupled to the first connection section through a via-hole, the first connection section extends in a direction close to the touch driving circuit board, and the first compensation line at least includes a first compensation section proximate to the first connection section.

In a possible embodiment of the present disclosure, the first compensation line further includes a second compensation section proximate to the second connection section, and one end of the second compensation section is coupled to the first compensation section.

In a possible embodiment of the present disclosure, the first compensation line further includes a third compensation section proximate to the third connection section, and one end of the second compensation section and one end of the third compensation section are coupled to the first compensation section through a via-hole.

In a possible embodiment of the present disclosure, the first flexible circuit board is of a multi-layered board structure.

In a possible embodiment of the present disclosure, in the second direction, there is one second binding region or a plurality of second binding regions spaced apart from each other, one end of the second sub-lead is coupled to a corresponding second binding region, the other end of the second sub-lead is coupled to the touch driving circuit board, and the second compensation line is arranged proximate to the second sub-lead.

In a possible embodiment of the present disclosure, a spacing between the first compensation line and the second sub-lead is identical to a spacing between two adjacent second leads.

In a possible embodiment of the present disclosure, in a direction away from the second binding region, the plurality of first sub-touch lines includes a plurality of third lines proximate to the first line. In the second direction, at least one second compensation line is arranged in a side-by-side manner at a side of the first compensation line away from the second lead, and the at least one second compensation line is coupled to at least one of the plurality of third lines respectively.

In a possible embodiment of the present disclosure, the touch panel includes N first touch lines; in the first direction, the plurality of first sub-touch lines is arranged sequentially in an order from 1 to n, the plurality of second sub-touch lines is arranged sequentially in an order from n+1 to N, and a serial number of the first line is n; and in a direction away from the second lead, an $m^{th}$ second compensation line is coupled to an $(n-m)^{th}$ third line, where m is a natural number greater than or equal to 1.

In a possible embodiment of the present disclosure, a spacing between the second compensation line and the first compensation line is identical to a spacing between two adjacent second leads, and in a case that there are at least two second compensation lines, a spacing between two adjacent second compensation lines is identical to the spacing between two adjacent second leads.

In a possible embodiment of the present disclosure, a fourth lead coupled to the other of the first touch line and the second touch line is further arranged on the first flexible circuit board, and the fourth lead and the second lead are arranged side by side; in the second direction, a first signal line and a second signal line are arranged at two opposite sides of the second lead respectively, the first signal line is configured to receive a shielding signal, and the second signal line is grounded; and in the second direction, the first signal line and the second signal line are arranged at two opposite sides of the fourth lead respectively.

In a possible embodiment of the present disclosure, the second signal line is shared between the second lead and the fourth lead.

In a possible embodiment of the present disclosure, the first touch line is a driver electrode line, and the second touch line is a sensor electrode line.

In a possible embodiment of the present disclosure, the first flexible circuit board is coupled to the touch driving circuit board via an adapter.

In another aspect, the present disclosure provides in some embodiments a touch display module, including: a touch panel, a first binding region and a second binding region being arranged at two opposite ends of the touch panel in a first direction, the first binding region and the second binding region being both arranged at a light-exiting side of the touch panel, the touch panel including a plurality of first touch lines and a plurality of second touch lines, ones of the plurality of first touch lines and the plurality of second touch lines including a plurality of first sub-touch lines extending to the first binding region and a plurality of second sub-touch lines extending to the second binding region; a touch driving circuit board, a touch IC being arranged on the touch driving circuit board, a plurality of first leads corresponding to the plurality of first sub-touch lines being arranged on the touch driving circuit board; a first flexible circuit board, one end of the first flexible circuit board being bound to the second binding region, the other end of the first flexible circuit board being bound to the touch driving circuit board, a plurality of second leads corresponding to the plurality of second sub-touch lines being arranged on the first flexible circuit board so that the plurality of second sub-touch lines is coupled to the touch IC, a first compensation line being further arranged on the first flexible circuit board, the first compensation line being arranged at a side where the plurality of second leads is located in a second direction perpendicular to the first direction, the first compensation line and the second leads being arranged side by side, one end of the first compensation line being coupled to a corresponding first sub-touch line via the touch driving circuit board; and a second flexible circuit board, one end of the second flexible circuit board being bound to the touch panel via the first binding region, the other end of the second flexible circuit board being coupled to the touch driving circuit board, a third lead corresponding to each first sub-touch line being arranged on the second flexible circuit board, and each first sub-touch line being coupled to the touch IC via the third lead and the corresponding first lead on the touch driving circuit board.

In a possible embodiment of the present disclosure, in the first direction, the plurality of first sub-touch lines includes a first line arranged proximate to the second binding region, and the plurality of second sub-touch lines includes a second line arranged proximate to the first binding region. The plurality of first leads includes a first sub-lead corresponding to the first line, the plurality of second leads includes a second sub-lead corresponding to the second line, the first compensation line is arranged proximate to the second sub-lead, and the first compensation line is coupled to the first sub-lead.

In a possible embodiment of the present disclosure, there is a gap between the first compensation line and the second binding region.

In yet another aspect, the present disclosure provides in some embodiments a touch display device including the above-mentioned touch display module.

The present disclosure has the following beneficial effects. In the embodiments of the present disclosure, the plurality of first touch lines includes the plurality of first sub-touch lines and the plurality of second sub-touch lines extending from two opposite sides of the touch panel respectively, the first sub-touch line is coupled to the touch IC on the touch driving circuit board via the first flexible circuit board, and the second sub-touch line is directly coupled to the touch IC on the touch driving circuit board. In order to prevent the occurrence of any difference between capacitances of the first sub-touch line and the second sub-touch line, the first compensation line is provided, so as to further improve the touch accuracy

DETAILED DESCRIPTION

Figure 1:
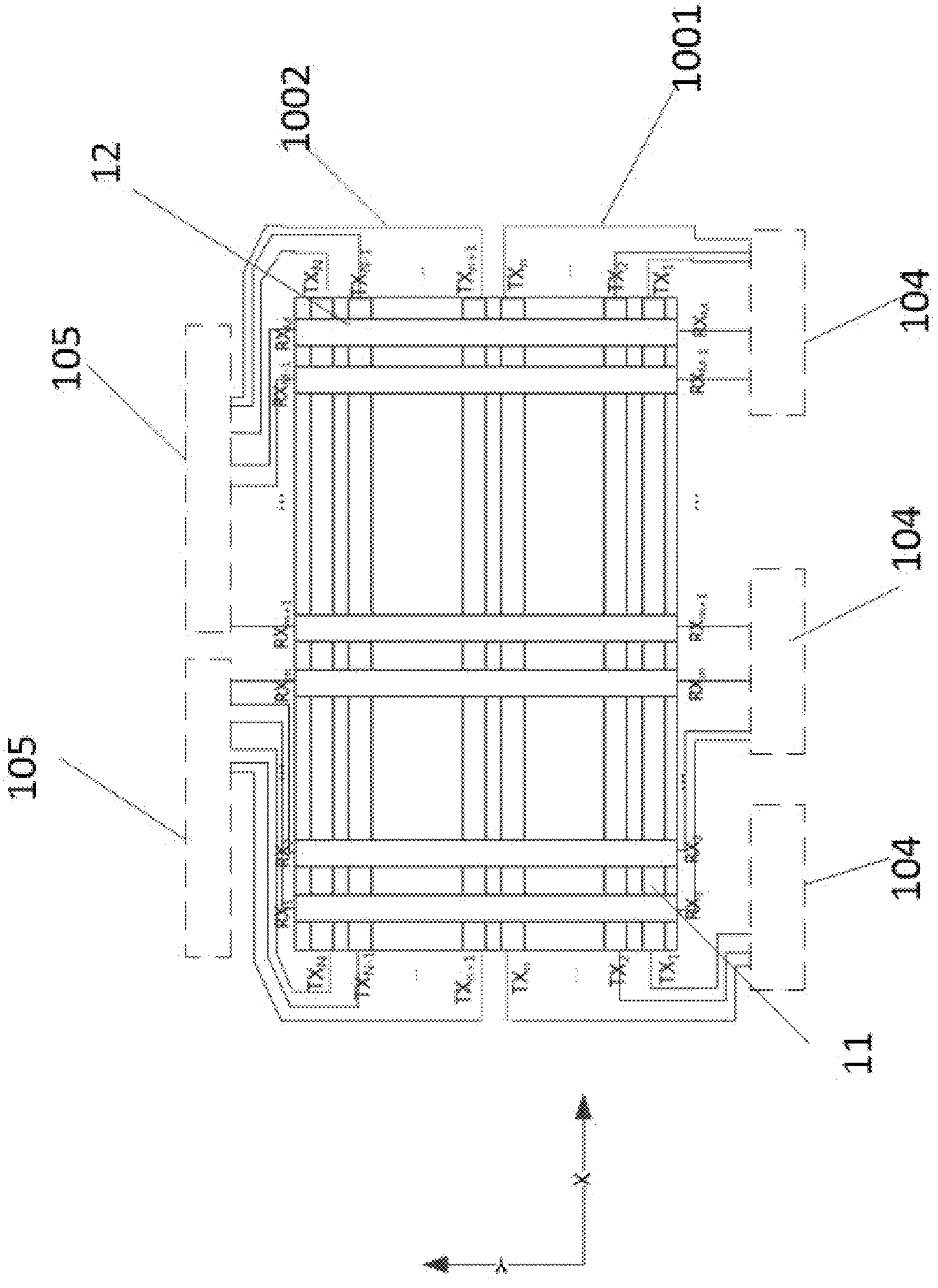
FIG. 1 is a schematic view showing the distribution of touch channels according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

As shown in FIGS. 1 to 4, the present disclosure provides in some embodiments a touch display module, which includes a touch panel 1. The touch panel 1 includes a plurality of first touch channels 11 and a plurality of second touch channels 12. Each first touch channel 11 extends in a second direction X, and each second touch channel 12 extends in a first direction Y. The second direction X intersects the first direction Y. For example, the second direction X is perpendicular to the first direction Y.

It should be appreciated that, the second direction X may be a transverse direction of the touch panel 1, and the first direction Y may be a longitudinal direction of the touch panel 1; or the second direction X may be a row direction of an array of a plurality of subpixels on the touch panel 1, and the first direction Y may be a column direction of the array of the plurality of subpixels on the touch panel 1.

Each first touch channel 11 includes a plurality of first touch electrodes Tx arranged in the second direction X and coupled to each other in series, and each second touch channel 12 includes a plurality of second touch electrodes Rx arranged in the first direction Y and coupled to each other in series. The plurality of first touch channels 11 is insulated from the plurality of second touch channels 12, and the plurality of first touch channels 11 intersects each second touch channel 12, so that the first touch electrodes Tx are insulated from the second touch electrodes Rx, and the first touch electrodes Tx and the second touch electrodes Rx are arranged alternately.

The first touch electrodes Tx and the second touch electrodes Rx are arranged alternately, adjacent different touch electrodes (i.e., the first touch electrode Tx and the second touch electrode Rx) are insulated from each other, and a mutual capacitance is generated between the touch electrodes. After the touch electrodes have been touched, the mutual capacitance may change. Through detecting the mutual capacitance, a change in the mutual capacitance before and after the touching is determined, so as to determine a touch position, thereby to achieve a touch effect of the touch panel 1.

For example, a pitch of a touch sensor electrode is, but not limited to, 3.8 mm to 4.2 mm.

The touch panel 1 further includes a plurality of touch lines, the plurality of touch lines includes a plurality of first touch lines and a plurality of second touch lines, the plurality of first touch lines is electrically coupled to the plurality of first touch channels 11, and the plurality of second touch lines is electrically coupled to the plurality of second touch channels 12.

Figure 2:
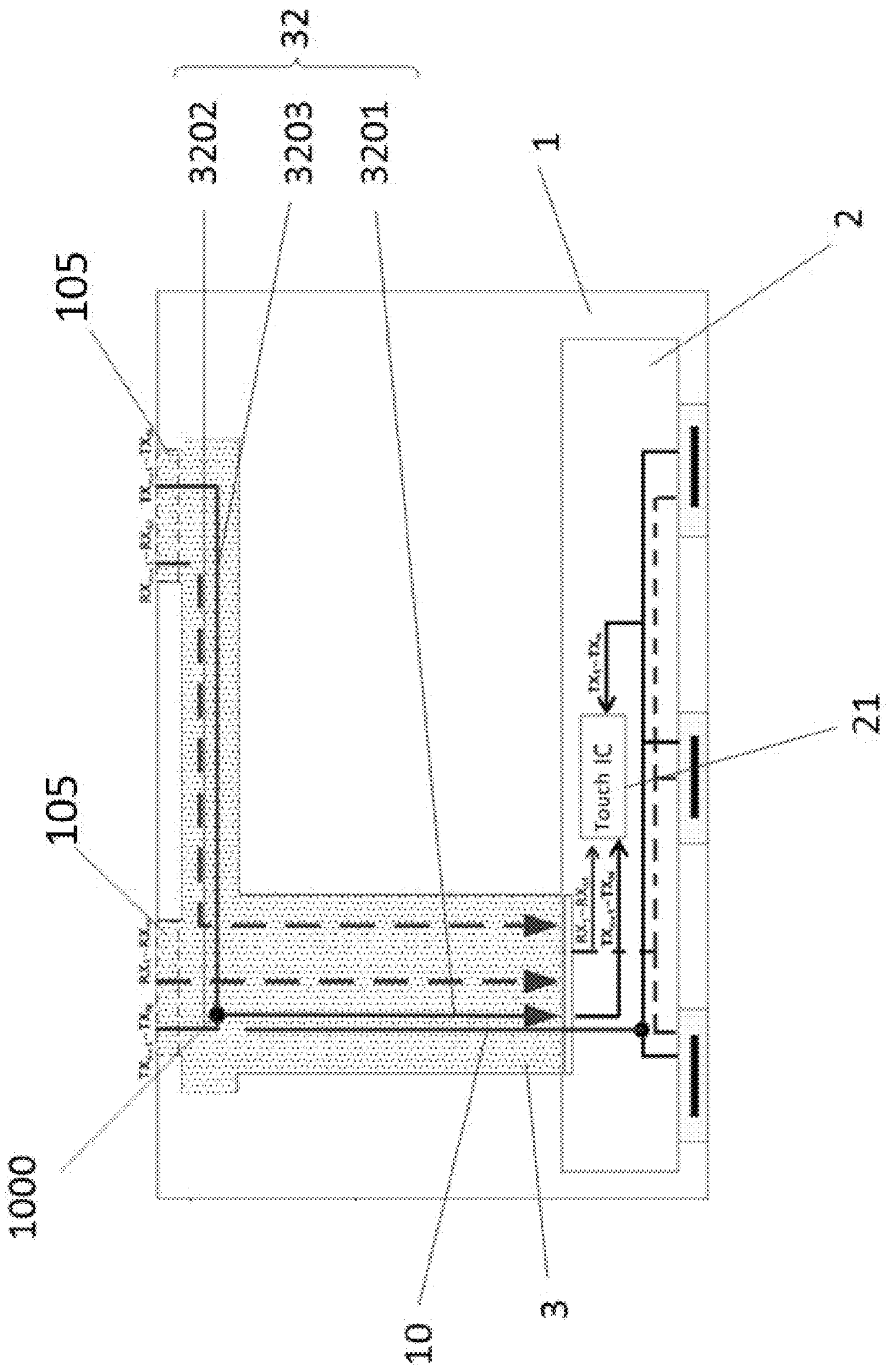
FIG. 2 is a schematic view showing a touch display module according to one embodiment of the present disclosure.

For example, as shown in FIGS. 1 and 2, the touch panel 1 includes a touch region and a peripheral region surrounding the touch region. In the first direction, a first binding region 104 and a second binding region 105 are arranged at two opposite sides of the touch region respectively (it should be appreciated that, in FIG. 1, dotted boxes show a relative position relationship between the first binding region 104 and the second binding region 105, rather than a specific connection relationship therebetween), and the first binding region 104 and the second binding region 105 are both arranged at a backlight side of the touch panel 1 (it should be appreciated that, the quantity of first binding regions 104 and second binding regions 105 will not be particularly defined). In the first direction, the touch panel 1 includes an upper half screen and a lower half screen, the first touch channels 11 at the upper half screen include touch channels TXn+1 to TXN (it should be appreciated that, n is approximately a half of N; for example, in a case that N is an even number, and n is N/2, e.g., in a case that N is 6, n is 3; and in a case that N is an odd number, n is (N−1)/2 or (N+1)/2, e.g., in a case that N is 9, n is 4 or 5), and the first touch channels 11 at the lower half screen include touch channels TX1 to TXn. The plurality of first touch lines includes a plurality of first sub-touch lines 1001 at the lower half screen and a plurality of second sub-touch lines 1002 at the upper half screen. Two opposite ends of each first touch channel 11 at the lower half screen are coupled to two first sub-touch lines 1001 respectively, and two opposite ends of each first touch channel 11 at the upper half screen are coupled to two second sub-touch lines 1002 respectively. The two first sub-touch lines 1001 coupled to a same first touch channel 11 are curved and extend to the first binding region 1004, and the two second sub-touch lines 1002 coupled to a same first touch channel 11 are curved and extend to the second binding region 105.

It should be appreciated that, the first binding region 104 and the second binding region 105 are both arranged at a backlight side of the touch panel 1. Each first sub-touch line 1001 is curved and extends to the first binding region 104, each second sub-touch line 1002 is curved and extends to the second binding region 105, but the present disclosure is not limited thereto. The first binding region 104 and the second binding region 105 may be both arranged at a light-exiting side of the touch panel 1.

Referring to FIG. 2, the touch display module further includes a touch driving circuit board 2. For example, the touch driving circuit board 2 is bound to the touch panel 1 via a chip on film. A touch IC 21 (i.e., a touch chip) is arranged on the touch driving circuit board 2, and the touch chip is electrically coupled to the touch electrodes (e.g., the first touch electrode Tx and the second touch electrode Rx), so as to transmit a touch signal to the touch electrodes, thereby to achieve a touch function of the touch panel 1.

Referring to FIG. 2, the touch display module further includes a flexible circuit board, the flexible circuit board includes a first flexible circuit board 3 and a second flexible circuit board (not shown), one end of the second flexible circuit board is bound to the touch panel 1 via the first binding region 104, and the other end of the second flexible circuit board is bound to the touch driving circuit board 2. A third lead (not shown) corresponding to each first sub-touch line is arranged on the second flexible circuit board. Each first sub-touch line is coupled to the touch IC via the third lead and the first lead on the touch driving circuit board. One end of the first flexible circuit board 3 is bound to the touch panel 1 via the second binding region, and the other end of the first flexible circuit board 3 is coupled to the touch driving circuit board 2 via a Zero Insertion Force (ZIF) adapter.

It should be appreciated that, the quantity of ZIF adapters may be one or more. In a case that there are a large quantity of first touch lines coupled to the first touch channels and a large quantity of second touch lines coupled to the second touch channels, there may exist a plurality of ZIF adapters.

The plurality of first sub-touch lines 1001 passes through the touch panel 1 and the touch driving circuit board 2, and finally is coupled to the touch IC 21 of the touch driving circuit board 2. The plurality of second sub-touch lines 1002 passes through the touch panel 1, extends from a binding end of the first flexible circuit board 3 (i.e., the second bind region 105 in FIG. 2) to the first flexible circuit board 3, then is coupled to the touch driving circuit board 2 via the ZIF adapter, and finally is coupled to the touch IC 21 of the touch driving circuit board 2. A length of the first touch sub-touch line 1001 is greater than a length of the second sub-touch line 1002 by a length of the first flexible circuit board 3, so a parasitic capacitance $C_{FPC}$ is additionally introduced for the plurality of first sub-touch lines 1001 at the lower half screen, and thereby there is a difference between a capacitance of the first sub-touch line 1001 and a capacitance of the second sub-touch line 1002.

Referring to FIGS. 1 and 2, the plurality of first sub-touch lines 1001 at a same side of the first touch channel are arranged proximate to each other and arranged parallel to each other, and the plurality of second sub-touch lines 1002 at a same side of the first touch channel are arranged proximate to each other and arranged parallel to each other. However, the plurality of first sub-touch lines 1001 and the plurality of second sub-touch lines 1002 extend in different directions and are coupled to different binding regions, so a first sub-touch line $TX_n$ and a second sub-touch line $TX_{n+1}$ at a boundary between the upper half screen and the lower half screen of the touch panel 1 are not arranged close to each other (i.e., the first sub-touch line $TX_n$ and the second sub-touch line $TX_{n+1}$ at a same side of the first touch channel), and a coupling capacitance therebetween is reduced as compared with the other sub-touch lines.

Based on the above, there is a difference between ground capacitances of the first touch channels 11 at the upper half screen and the lower half screen of the touch panel 1. Especially, at a boundary between the upper half screen and the lower half screen, there is a difference between the ground capacitances of the first touch channel 11 coupled to the first sub-touch line $TX_n$ and the first touch channel 11 coupled to the second sub-touch line $TX_{n+1}$, and the difference has a value equal to $C_{FPC}$, about several pF.

The touch panel 1 needs to support a capacitive active pen, and the touch performance of the active pen is influenced by raw capacitance uniformity of the touch channels of the touch panel 1 (including the first touch channels 11 and the second touch channels 12). Especially, the calculation of coordinates of the active pen is directly influenced by the difference between the capacitances of the adjacent touch channels. Due to the above phenomenon, the key performance of the active pen, e.g., the touch accuracy and the pen linearity, may be deteriorated at regions corresponding to the first sub-touch line $TX_n$ and the second sub-touch line $TX_{n+1}$ as well as a neighboring region.

Referring to FIGS. 2 to 5, in order to solve the above-mentioned problem, in the embodiments of the present disclosure, the touch display module further includes a first compensation line 10 arranged proximate to, and parallel to, the second sub-touch line $TX_{n+1}$, so as to increase and supplement the coupling capacitance between the first sub-touch line $TX_n$ and the second sub-touch line $TX_{n+1}$, i.e., compensate for the difference in the capacitances between the adjacent touch channels at the boundary between the upper half screen and the lower half screen of the touch panel 1, increase the raw capacitance uniformity of the touch panel 1, improve the touch performance of the active pen at the boundary, achieve a higher performance specification of the active pen, and meet the requirement of an Organic Light-Emitting Diode (OLED) touch panel on the performance of the active pen in a high-end tablet or laptop computer.

For example, a plurality of first leads 201 corresponding to the plurality of first sub-touch lines 1001 is arranged on the touch driving circuit board 2, so that the plurality of first sub-touch lines 1001 is coupled to the touch IC 21. A plurality of second leads 32 corresponding to the plurality of second sub-touch lines 1002 is arranged on the first flexible circuit board 3, so that the plurality of second sub-touch lines 1002 is finally coupled to the touch IC 21.

In the second direction perpendicular to the first direction, a first compensation line 10 is arranged at a side where the plurality of second leads 32 is located, the first compensation line 10 and the second leads 32 are arranged side by side, one end of the first compensation line 10 is coupled to a corresponding first sub-touch line 1001 via the touch driving circuit board 2, and the other end of the first compensation line 10 is insulated from the second binding region.

Figure 5:
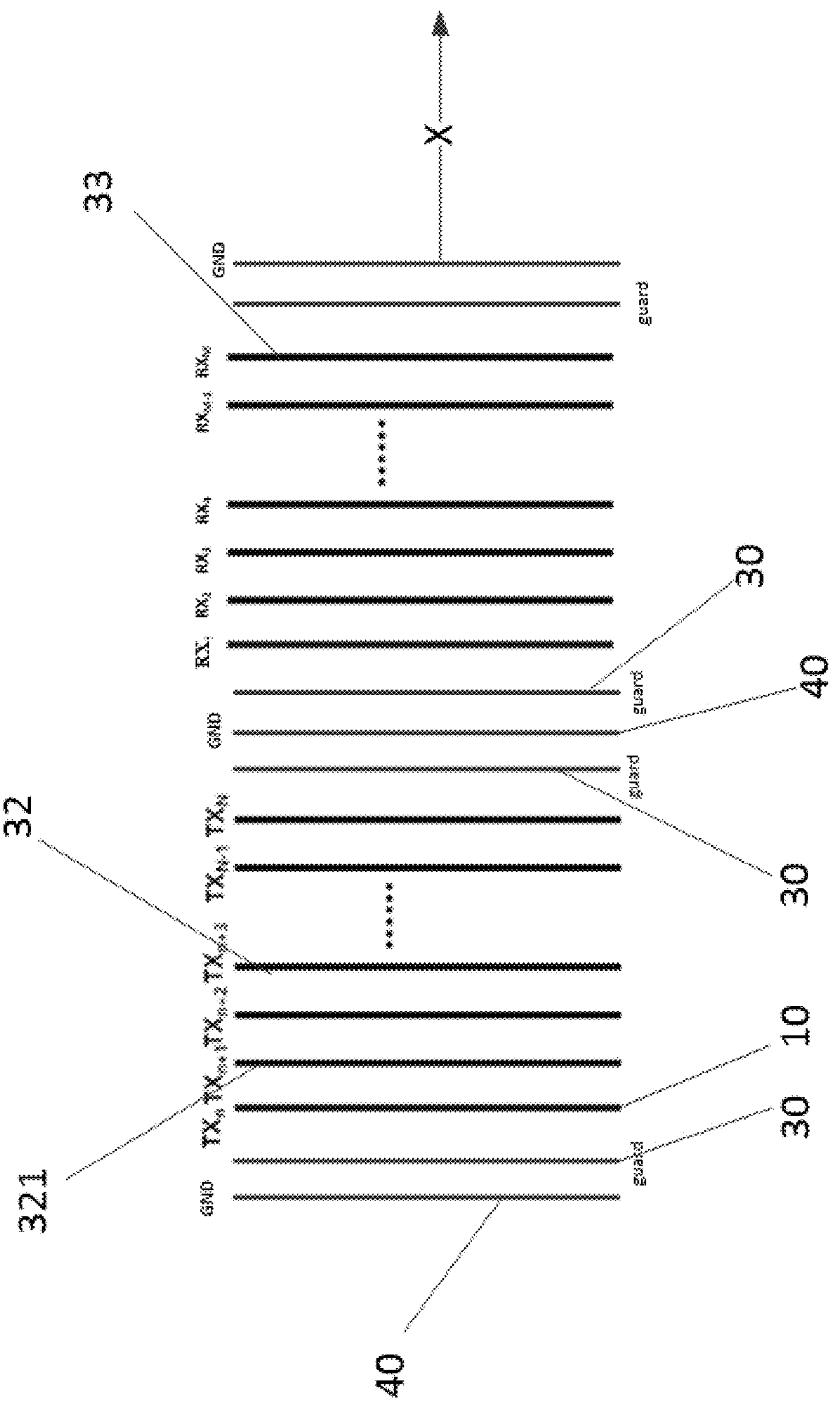
FIG. 5 is a schematic view showing the distribution of second leads on a first flexible circuit board.

FIG. 5 shows the distribution of the second leads, a plurality of fourth leads and the first compensation line on the first flexible circuit board, serial numbers $TX_{n+1}$ to $TX_N$ of the second sub-touch lines coupled to the plurality of second leads 32, a serial number $TX_n$ of the first sub-touch line coupled to the first compensation line 10, and serial numbers $RX_1$ to $RX_M$ of the second touch lines coupled to the plurality of fourth leads 33. For example, in the first direction, the plurality of first sub-touch lines 1001 includes a first line (i.e., the first sub-touch line $TX_n$) arranged proximate to the second binding region, and the plurality of second sub-touch lines 1002 includes a second line (i.e., the second sub-touch line $TX_{n+1}$) arranged proximate to the first binding region.

The plurality of first leads includes a first sub-lead corresponding to the first line, the plurality of second leads 32 includes a second sub-lead 321 corresponding to the second line (i.e., the first sub-touch line $TX_{n+1}$ proximate to the first sub-touch line $TX_n$), the first compensation line 10 is arranged proximate to the second sub-lead 321, and the first compensation line 10 is coupled to the first sub-lead.

Referring to FIGS. 1 to 5, through the first compensation line 10, the first sub-touch line $TX_n$ extends to the first flexible circuit board 3, and the first sub-touch line $TX_n$ is arranged proximate to, and parallel to, the second sub-lead 321 corresponding to the second sub-touch line $TX_{n+1}$, so as to increase and supplement the coupling capacitance between the first sub-touch line $TX_n$ and the second sub-touch line $TX_{n+1}$.

Figure 6:
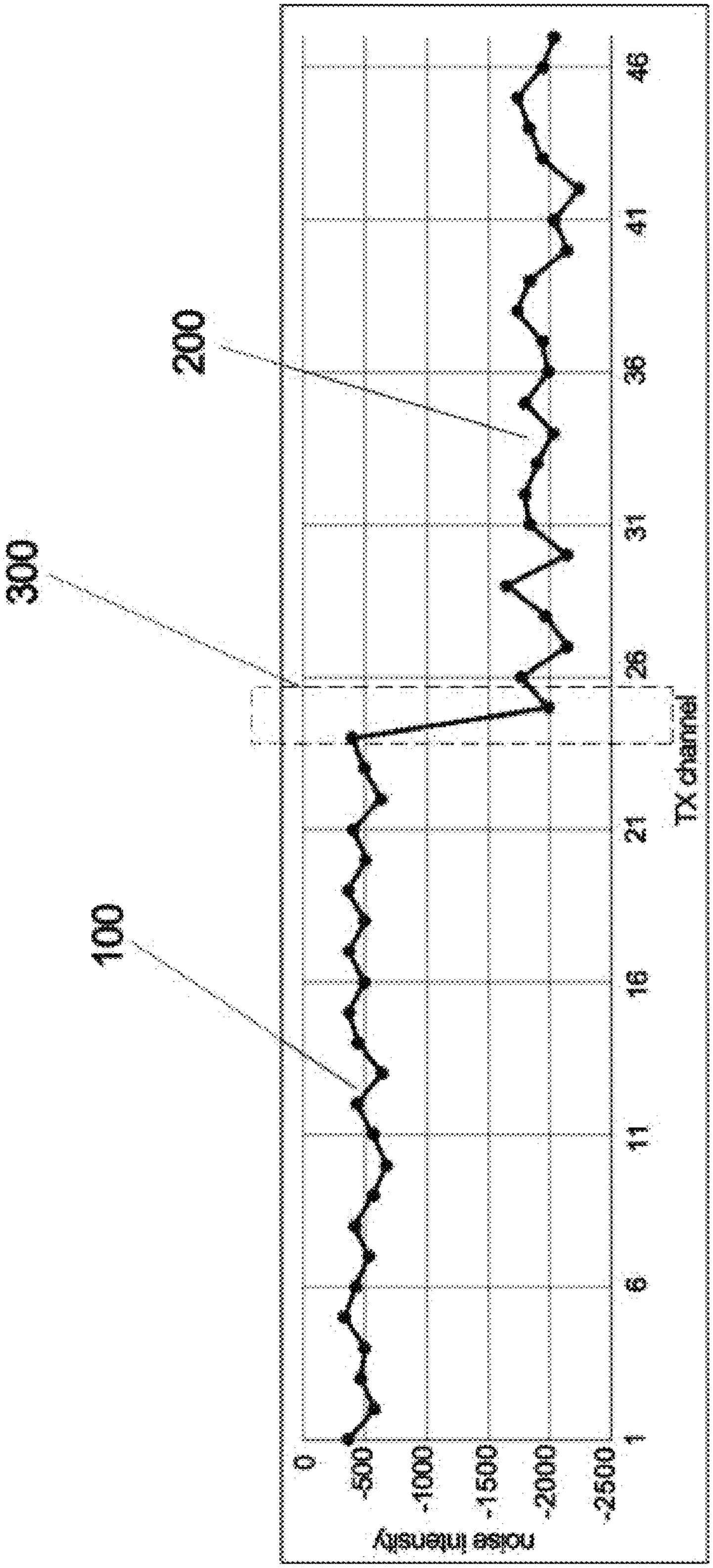
FIG. 6 is a curve diagram of the distribution of a noise intensity of a first touch channel.

In addition, in a case of no first compensation line 10, in an active pen mode, a noise intensity of the touch channels of the touch display module is tested using the touch IC 21. The noise intensity of the first touch channels 11 at the upper half screen (the touch channels coupled to the second sub-touch lines $TX_{n+1}$ to $TX_N$) is obviously different from the noise intensity of the first touch channels 11 at the lower half screen (the touch channels coupled to the first sub-touch lines $TX_1$ to $TX_n$). The noise intensity of the first touch channel 11 at the upper half screen is large, while the noise intensity of the first touch channel 11 at the lower half screen is small. In FIG. 6, a sign 100 represents the noise intensity of the first touch channel at the upper half screen, a sign 200 represents the noise intensity of the first touch channel at the lower half screen, and there is an obvious difference between the noise intensity of the first touch channel 11 coupled to the first sub-touch line $TX_n$ and the noise intensity of the first touch channel 11 coupled to the second sub-touch line $TX_{n+1}$, i.e., a region between signs 100 and 200, or a region indicated by a sign 300. The second sub-touch line 1002 at the upper half screen additionally passes through the first flexible circuit board 3, and a background noise is introduced by the first flexible circuit board 3, so that the noise intensity of the first touch channel 11 at the upper half screen measured by the touch IC 21 is greater than the noise intensity of the first touch channel 11 at the lower half screen. Due to the difference between the noise intensity of the first touch channel 11 coupled to the first sub-touch line $TX_n$ and the noise intensity of the first touch channel 11 coupled to the second sub-touch line $TX_{n+1}$, the touch performance of the active pen, e.g., scribing and the transmission of a pressure signal, may be adversely affected at a region between the first touch channel 11 coupled to the first sub-touch line $TX_n$ and the first touch channel 11 coupled to the second sub-touch line $TX_{n+1}$. For example, in MPP2.0, the transmission of the pressure signal is transmitted through downlink signals of the active pen at different frequencies, the touch IC 21 receives the downlink signals and determines a current pressure level, and interactive feedback is performed at a system end. Due to the large difference between the noise intensity of the first touch channel 11 coupled to the first sub-touch line $TX_n$ and the noise intensity of the first touch channel 11 coupled to the second sub-touch line $TX_{n+1}$, the reception of the downlink signals by the touch IC 21 may be remarkably interfered at the region, so the pressure level and the user experience may be adversely affected.

Figure 7:
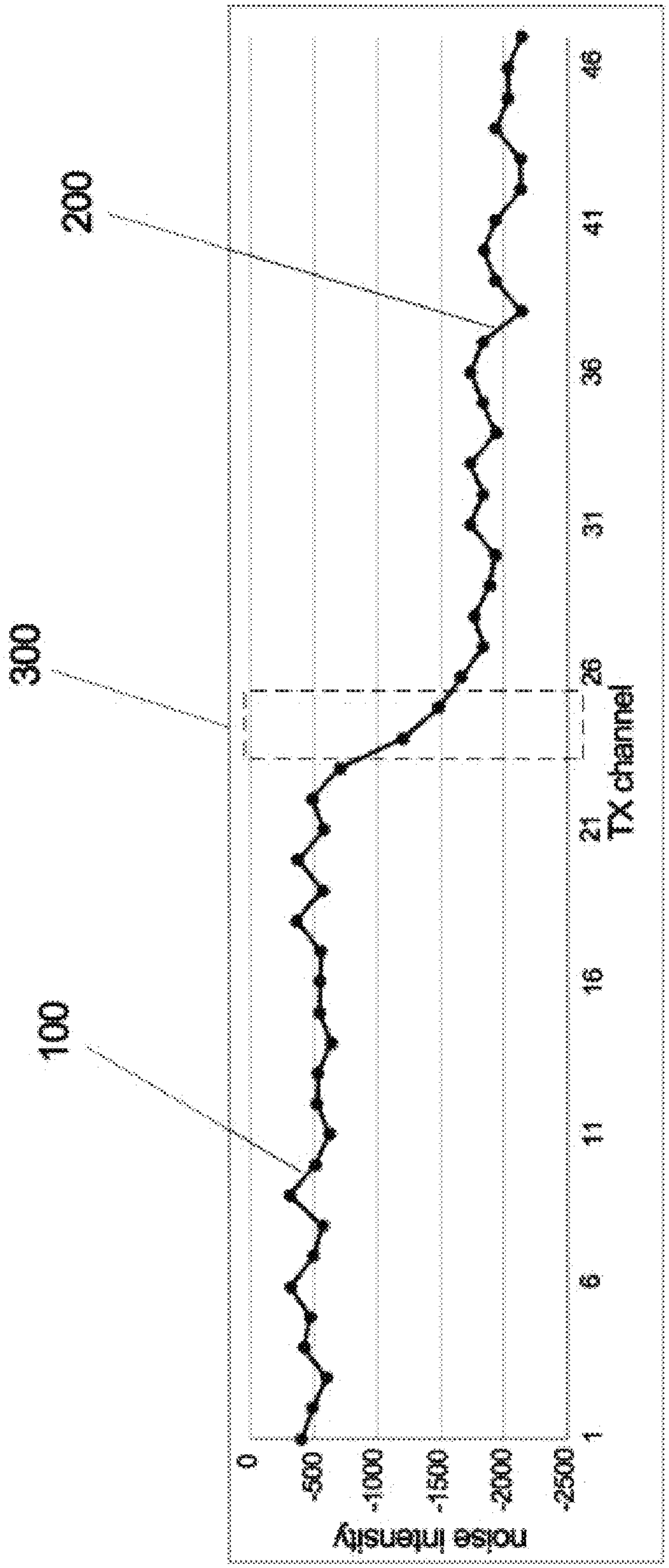
FIG. 7 is another curve diagram of the distribution of the noise intensity of the first touch channel.

Through the additional first compensation line 10 on the touch panel 1, it is able to reduce the difference between the noise intensity of the first touch channels 11 ($TX_{n+1}$ to $TX_N$) at the upper half screen and the noise intensity of the first touch channels 11 ($TX_1$ to $TX_n$) at the lower half screen, thereby to improve the scribing as well as the transmission of the pressure signal for the active pen. FIG. 6 shows the distribution of the noise intensity of the first touch channels in a case of no first compensation line 10, and FIG. 7 shows the distribution of the noise intensity of the first touch channels in a case of the first compensation line 10. Comparing FIG. 6 with FIG. 7, after the addition of the first compensation line 10, it is able to remarkably reduce the difference between the noise intensity of the first touch channels 11 ($TX_{n+1}$ to $TX_N$) at the upper half screen and the noise intensity of the first touch channels 11 ($TX_1$ to $TX_n$).

Referring to FIG. 5, for example, in the second direction (direction X), a plurality of second leads 32 and a plurality of fourth leads 33 are arranged side by side on the first flexible circuit board 3. FIG. 5 shows serial numbers $TX_{n+1}$ to $TX_N$ of the second sub-touch lines coupled to the plurality of second leads 32, a serial number of the first sub-touch line coupled to the first compensation line 10, and serial numbers $RX_1$ to $RX_M$ of the second touch lines coupled to the plurality of fourth leads 33. In the second direction, a first signal line (guard) 30 (arranged at a side of the first compensation line 10 away from the second lead 32) configured to receive a shielding signal and a grounded second signal line (GND) 40 are arranged two opposite sides of the second lead 32 respectively, and in the second direction, a first signal line (guard) 30 configured to receive a shielding signal and a grounded second signal (GND) 40 are arranged at two opposite sides of the fourth lead 33 respectively.

For example, in the second direction, the first signal line 30 is arranged at a side of the second signal line 40 close to the second lead 32 (or the fourth lead 33).

For example, the second signal line 40 is shared between the second lead 32 and the fourth lead 33. In other words, the first signal line 30, the second signal line 40 and the first signal line 30 are arranged sequentially at a region from the second lead 32 to the fourth lead 33.

The first signal line 30 is configured to receive the shielding signal, so as to prevent the occurrence of any interference among the grounded line, the first touch line and the second touch line.

The second signal line 40 is grounded, so as to prevent the occurrence of signal crosstalk.

Figure 3:
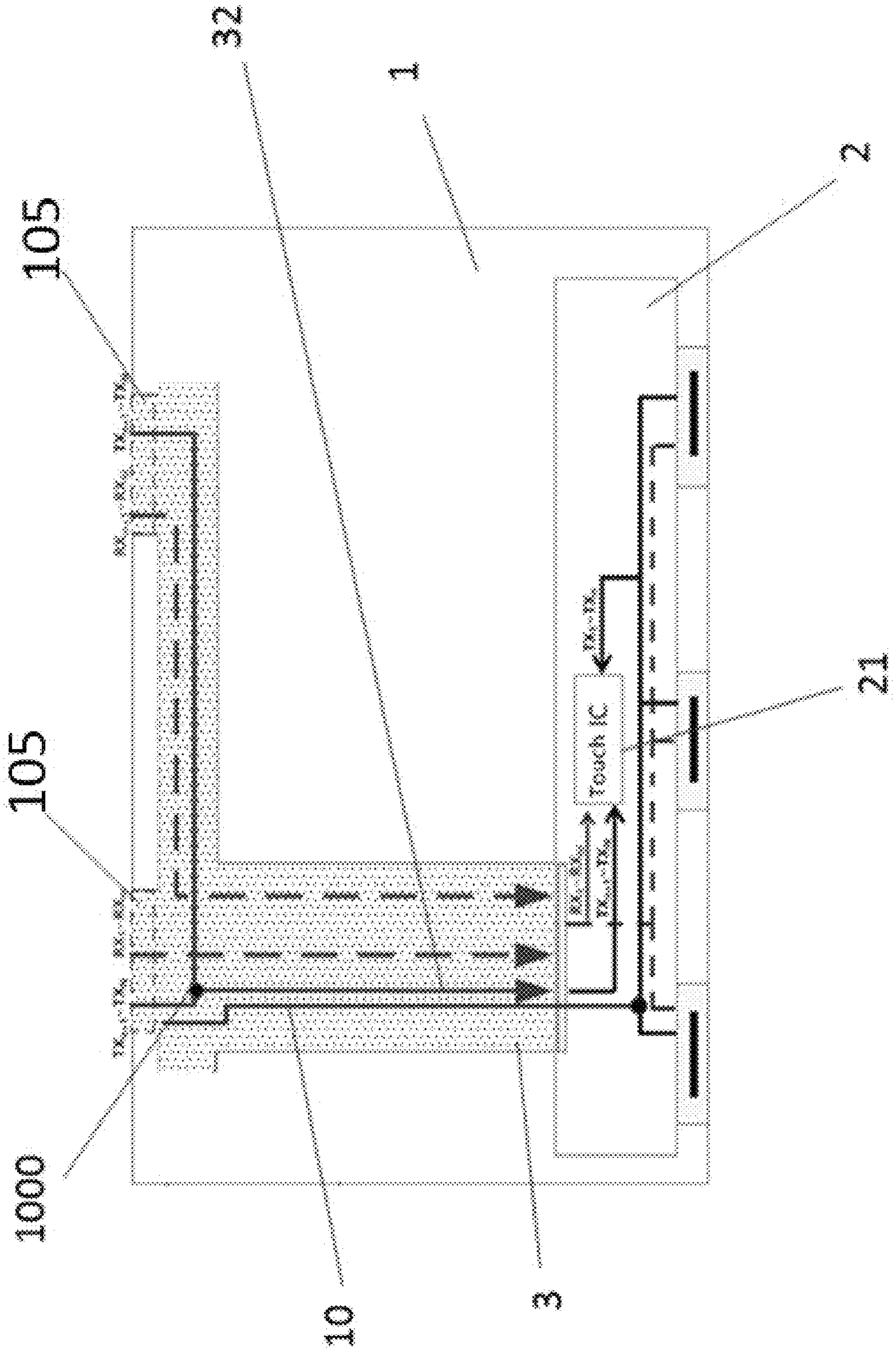
FIG. 3 is another schematic view showing the touch display module according to one embodiment of the present disclosure.
Figure 4:
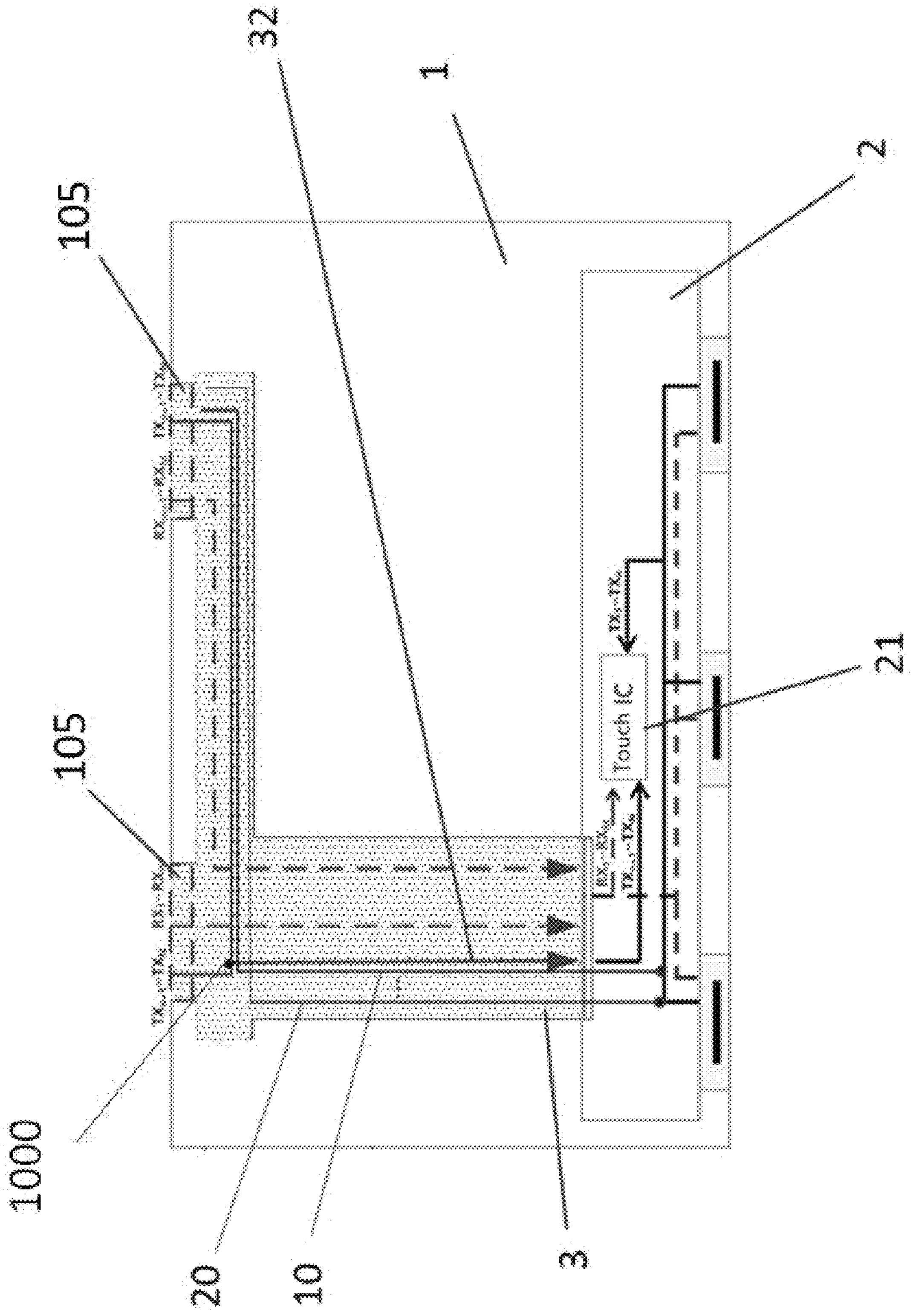
FIG. 4 is yet another schematic view showing the touch display module according to one embodiment of the present disclosure.

Referring to FIGS. 2 to 4, for example, there is a gap between the first compensation line 10 and the second binding region 105. The larger a length of a coupling path between the first compensation line 10 and the second sub-touch line $TX_{n+1}$, the better the compensation effect. However, the gap between the first compensation line 10 and the second binding region 105 shall not be too small. For example, in the first direction, the gap between the first compensation line 10 and the second binding region 105 is greater than or equal to, but not limited to, 0.25 mm, so as to prevent the connection of the touch panel 1 with the first flexible circuit board 3 from being adversely affected.

Referring to FIGS. 2 to 5, for example, in the second direction, there is one second binding region 105 or more second binding regions 105 spaced apart from each other, one end of the second sub-lead 321 is coupled to a corresponding second binding region 31, the other end of the second lead 321 is coupled to the touch driving circuit board 2, and the first compensation line 10 is arranged proximate to the second sub-lead 321.

Figure 9:
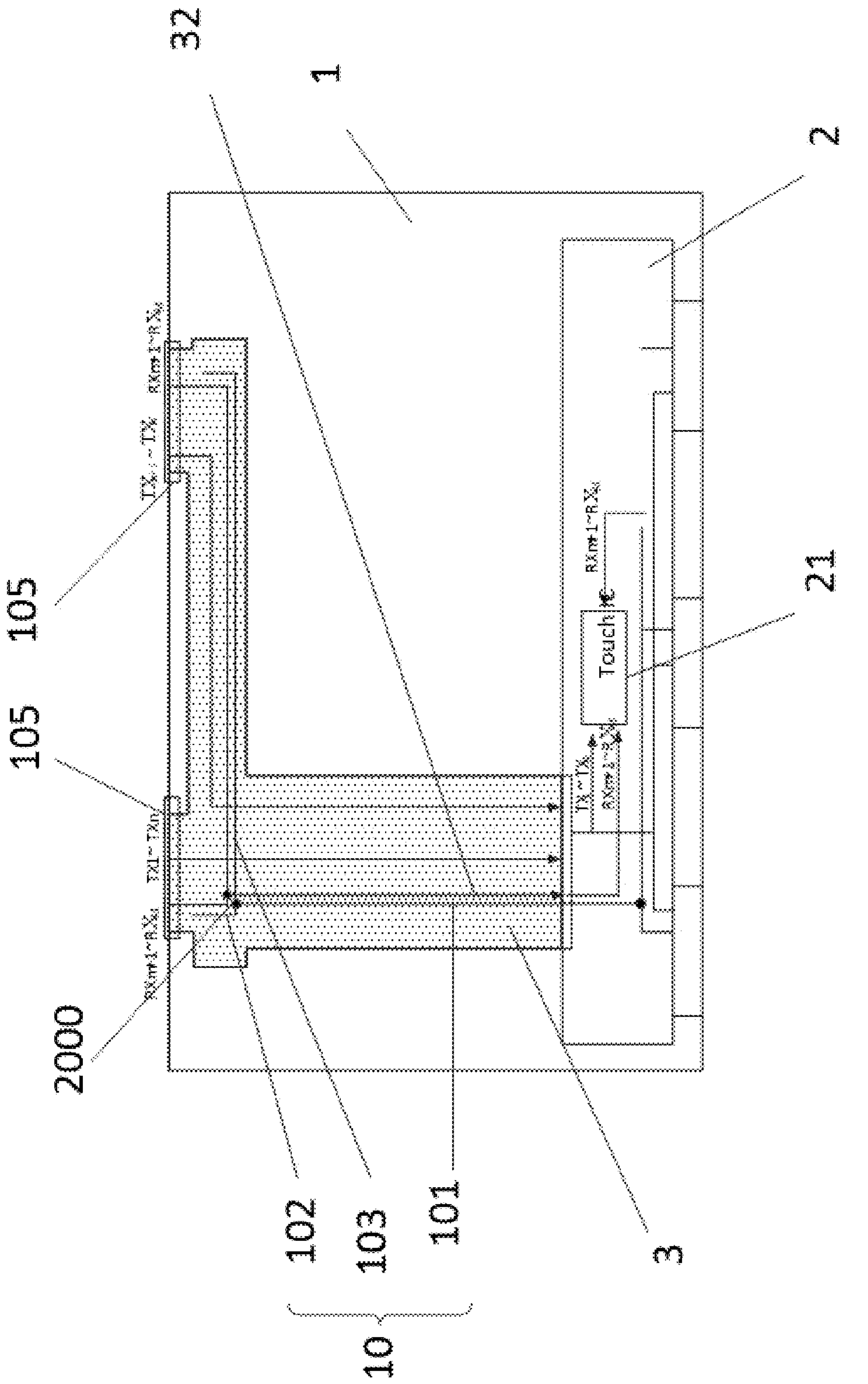
FIG. 9 is still yet another schematic view showing the touch display module according to one embodiment of the present disclosure.

Referring to FIGS. 2 and 9, for example, in the second direction, there are at least two second binding regions 105 spaced apart from each other. The second sub-lead 321 at least includes a first connection section 3201, a second connection section 3202 and a third connection section 3203 (it should be appreciated that, extension directions of the first connection section 3201, the second connection section 3202 and the third connection section 3203 are set according to the practical need, and the extension directions in FIG. 2 is for illustrative purposes only). One end of the second connection section 3202 is coupled to one of the second binding regions 105, one end of the third connection section 3203 is coupled to one of the second binding region 105, the other end of the second connection section 3202 and the other end of the third connection section 3203 are coupled to the first connection section 3201 through a via-hole (a first via-hole 1000), and the first connection section 3201 extends in a direction close to the touch driving circuit board 2.

For example, the first compensation line 10 at least includes a first compensation section 101 proximate to the first connection section 3201.

For example, the first compensation line 10 further includes a second compensation section 102 arranged proximate to the second connection section 3202, and one end of the second compensation section 102 is coupled to the first compensation section 101.

For example, the first compensation line 10 further includes a third compensation section 103 arranged proximate to the third connection section 3203, and one end of the second compensation section 102 and one end of the third compensation section 103 are coupled to the first compensation section 101 through a via-hole (a second via-hole 2000 in FIG. 9).

Figure 10:
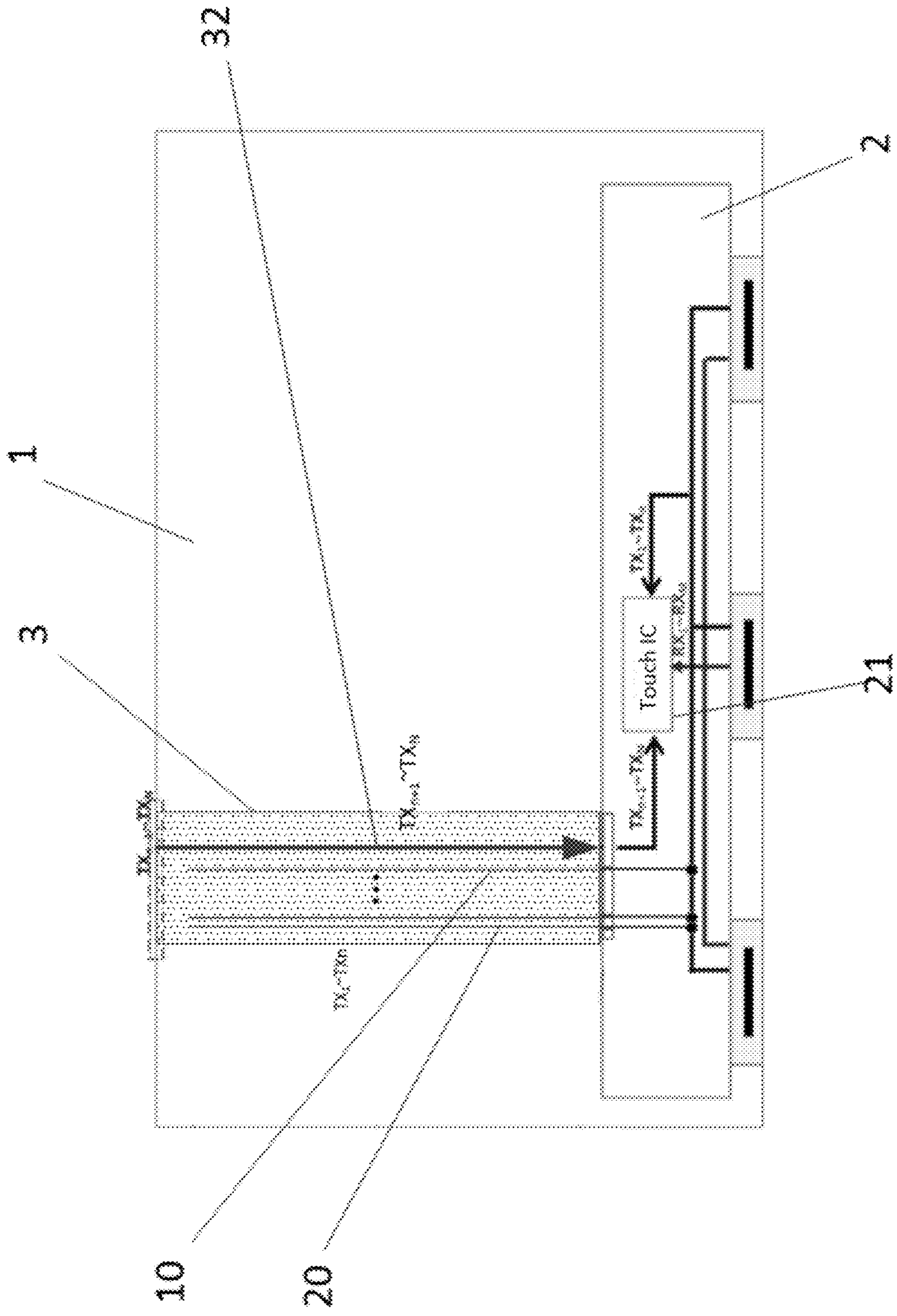
FIG. 10 is still yet another schematic view showing the touch display module according to one embodiment of the present disclosure.

Referring to FIG. 10, in a case that there is only one second binding region 105, the second lead coupled to the second sub-touch line 1002 at the upper half screen directly extends to a ZIF adapter, and it is unnecessary to provide any via-hole. In a case that there are two second binding regions 105, a section of the second sub-lead from the first via-hole 1000 to the other second binding region 105 is the third connection section 3203.

Referring to FIG. 10, the first compensation line 10 is arranged proximate to the second sub-lead, and there is a gap between the first compensation line 10 and the second binding region 105.

For example, in a direction away from the second binding region 105, the plurality of first sub-touch lines 1001 includes a plurality of third lines proximate to the first line.

In the second direction, at least one second compensation line 20 is arranged in a side-by-side manner at a side of the first compensation line 10 away from the second lead 32, the at least one second compensation line 20 is coupled to at least one of the plurality of third lines respectively, and there is a gap between the second compensation line 20 and the second binding region 105.

In FIG. 2, the first flexible circuit board 3 includes, but not limited to, two second binding regions 105. Referring to FIG. 1, one first touch line extends from each of two ends of each first touch channel 11, i.e., the touch panel 1 includes two groups of first touch lines extending from each side of the first touch channels 11, i.e., two groups of first sub-touch lines 1001 and two groups of second sub-touch lines 1002. The first flexible circuit board 3 includes two second binding regions 105 corresponding to different groups of second sub-touch lines 1002, and the second connection section 3202 and the third connection section 3203 coupled to different groups of second sub-touch lines 1002 intersect each other, so the second connection section 3202 and the third connection section 3203 need to be arranged at different layers (the first flexible circuit board 3 is of a multi-layered board structure) and coupled to each other through the via-hole (the first via-hole 1000). Two second sub-touch lines extending from a same first touch channel are coupled to the second connection section 3202 and the third connection section 3203 arranged at different layers on the first flexible circuit board 3, and then coupled to a same first connection section 3201 through a via-hole.

It should be appreciated that, the second touch sub-line coupled to the second touch channel, RX to $RX_m$ in FIG. 2, passes through the touch panel 1, and extends from the two binding regions 105 to the first flexible circuit board 3. The fourth leads 33 coupled to the second touch lines, which are coupled to different second binding regions 105, on the first flexible circuit board 3 are not coupled to each other through a via-hole, and instead, they directly extend along the first flexible circuit board 3 to the touch driving circuit board 2.

For example, the first compensation line 10 is arranged at a side of the second sub-lead 321, which is located at an edge of the first flexible circuit board 3, away from the other second lead.

For example, a spacing between the first compensation line 10 and the second sub-lead 321 is identical to a spacing between two adjacent second leads 32.

For example, a line width of the first compensation line 10 is identical to a line width of the second sub-lead 321.

Referring to FIG. 4, for example, in a direction away from the second binding region, the plurality of first sub-touch lines 1001 includes a plurality of third lines arranged proximate to the first line.

In the second direction, at least one second compensation line 20 is arranged in a side-by-side manner at a side of the first compensation line 10 away from the second lead 32, and the at least one second compensation line 20 is coupled to at least one of the plurality of third lines respectively.

In order to improve a compensation effect, the quantity of compensation lines may be increased, and the at least one compensation lines is coupled to the at least one third line respectively. In a possible embodiment of the present disclosure, a plurality of compensation lines (including the first compensation line 10 and the second compensation line 20) is arranged in such a manner as to be coupled to the at least one first sub-touch lines 1001 respectively, i.e., all the first sub-touch lines extend to the first flexible circuit board 3.

For example, the touch panel 1 includes N first touch lines. In the first direction, the plurality of first sub-touch lines 1001 is arranged sequentially in an order from 1 to n, the plurality of second sub-touch lines is arranged sequentially in an order from n+1 to N, and a serial number of the first line is n. In a direction away from the second lead 32, an $m^{th}$ second compensation line 20 is coupled to an $(n-m)^{th}$ third line, where m is a natural number greater than or equal to 1.

For example, as shown in FIG. 4, from left to right, the plurality of second sub-touch lines 1002 coupled to one second binding region 105 is ranked from $TX_{n+1}$ to $TX_N$, and the plurality of first sub-touch lines 1001 coupled to the plurality of compensation lines (including the first compensation line 10 and the second compensation line 20) is ranked from $TX_1$ to $TX_n$. Alternatively, from right to left, the plurality of second sub-touch lines 1002 coupled to one second binding region 105 is ranked from $TX_{n+1}$ to $TX_N$, and the plurality of first sub-touch lines 1001 coupled to the plurality of compensation lines is ranked from $TX_1$ to $TX_n$.

For example, a spacing between the second compensation line 20 and the first compensation line 10 is identical to a spacing between two adjacent second leads 32, and in a case that there are at least two second compensation lines 20, a spacing between two adjacent second compensation lines 20 is identical to the spacing between two adjacent second leads 32.

It should be appreciated that, in the embodiments of the present disclosure, the first touch channel TX extends in the second direction, and the second touch channel RX extends in the first direction. However, the present disclosure is not limited thereto, and an extension direction of the first touch channel 11 may be exchanged with an extension direction of the second touch channel 12. For example, the first touch channel TX extends in the first direction, and the second touch channel RX extends in the second direction.

Figure 8:
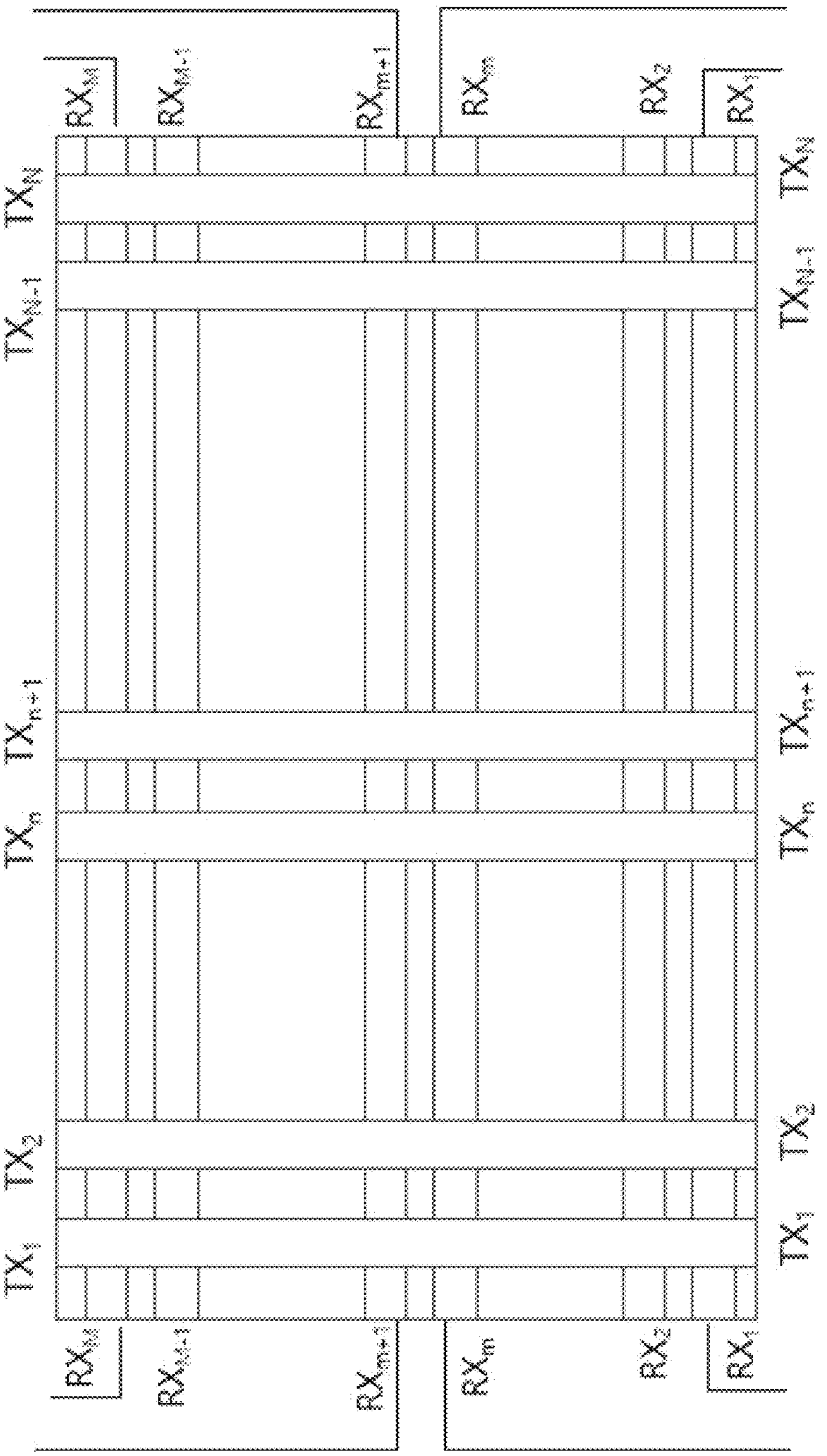
FIG. 8 is another schematic view showing the distribution of the touch channel according to one embodiment of the present disclosure.

It should be appreciated that, in the above embodiments of the present disclosure, the touch panel 1 includes a first portion and a second portion along the first direction. The first binding region and the second binding region are arranged at two opposite ends of the touch panel 1 in the first direction, and the first touch channel TX extends in the second direction perpendicular to the first direction. The first sub-touch line 1001 coupled to the first touch channel TX at the first portion extends to the first binding region, and the second sub-touch line 1002 coupled to the first touch channel TX at the second portion extends to the second binding region. However, the present disclosure is not limited thereto, and a layout mode of the first touch channel 11 may be exchanged with a layout of the second touch channel 12. For example, the second touch channel RX extends in the second direction perpendicular to the first direction, a third sub-touch line coupled to the second touch channel RX at the first portion extends to the first binding region, and a fourth sub-touch line coupled to the second touch channel RX at the second portion extends to the second binding region, as shown in FIG. 8. In FIG. 9, the first compensation line 10 is arranged proximate to a lead coupled to the fourth sub-touch line.

It should be appreciated that, the touch lines of the touch panel 1 may also be arranged in a 2T1R form, i.e., each of two ends of each first touch channel TX in its extension direction is coupled to one first touch line, and one end of each second touch channel RX in its extension direction is coupled to one second touch line, as shown in FIG. 10.

It should be appreciated that, the touch lines of the touch panel 1 may also be arranged in a 2R1T form, i.e., one end of each first touch channel TX in its extension direction is coupled to one first touch line, and each of two ends of each second touch channel RX in its extension direction is coupled to one second touch line.

It should be appreciated that, the touch lines of the touch panel 1 may also be arranged in a 2T2R form, i.e., each of two ends of each first touch channel TX in its extension direction is coupled to one first touch line, and each of two ends of each second touch channel RX in its extension direction is coupled to one second touch line.

For example, in order to reduce a parasitic capacitance (Cp loading) generated between the touch channel (including the first touch channel 11 and the second touch channel 12) and an OLED cathode layer of the touch panel 1 (the touch panel 1 includes a backplate circuit layer and a light-emitting layer, and the light-emitting layer includes an anode layer, a pixel definition layer, a light-emitting function layer and the cathode layer laminated one on another at a side of the backplate circuit layer away from a base substrate) and a RC loading of the touch channel, the touch lines of the touch panel 1 are arranged in a 2T2R form. In addition, in a case that the 2T2R form is used, it is able to provide a narrow bezel.

For example, each first touch line has a same resistance as each second touch line, so as to reduce an impedance difference between different touch electrodes.

For example, the touch display module further includes a timing controller (T-Con chip), and the timing controller is arranged on the touch driving circuit board 2 and configured to provide a timing control signal and a data display signal required by the touch driving circuit.

The touch panel 1 includes a backplate circuit layer and a light-emitting layer. The backplate circuit layer includes a base substrate, and an active layer, a first gate insulation layer, a first gate conductive layer, a second gate insulation layer, a second gate conductive layer, an interlayer dielectric layer, a first source/drain conductive layer, a passivation layer, a first planarization layer, a second source/drain conductive layer and a second planarization layer laminated one on another on the base substrate.

In a possible embodiment of the present disclosure, there exists only one source/drain conductive layer (e.g., the first source/drain conducive layer or the second source/drain conductive layer), and correspondingly there exists only one planarization layer (e.g., the first planarization layer or the second planarization layer).

The light-emitting layer includes an anode layer, a pixel definition layer, a light-emitting functional layer and a cathode layer laminated one on another at a side of the backplate circuit layer away from the base substrate.

For example, the light-emitting functional layer includes one or more of an electron transport layer (ETL), an electron injection layer (EIL), a hole transport layer (HTL) or a hole injection layer (HIL).

For example, an encapsulation layer is arranged at a side of the light-emitting layer away from the backplate circuit layer, so as to block moisture and oxygen.

A touch layer is arranged at a side of the encapsulation layer away from the backplate circuit layer, and a plurality of touch electrodes (including the touch electrodes Tx and the touch electrodes Rx) and the touch lines couples to the touch electrodes are arranged on the touch layer.

A polarizer is further arranged at a side of the touch layer away from the backplate circuit layer, a cover plate is arranged at a side of the polarizer away from the backplate circuit layer, and the polarizer is adhered to the cover plate through an optically clear adhesive.

Figure 11:
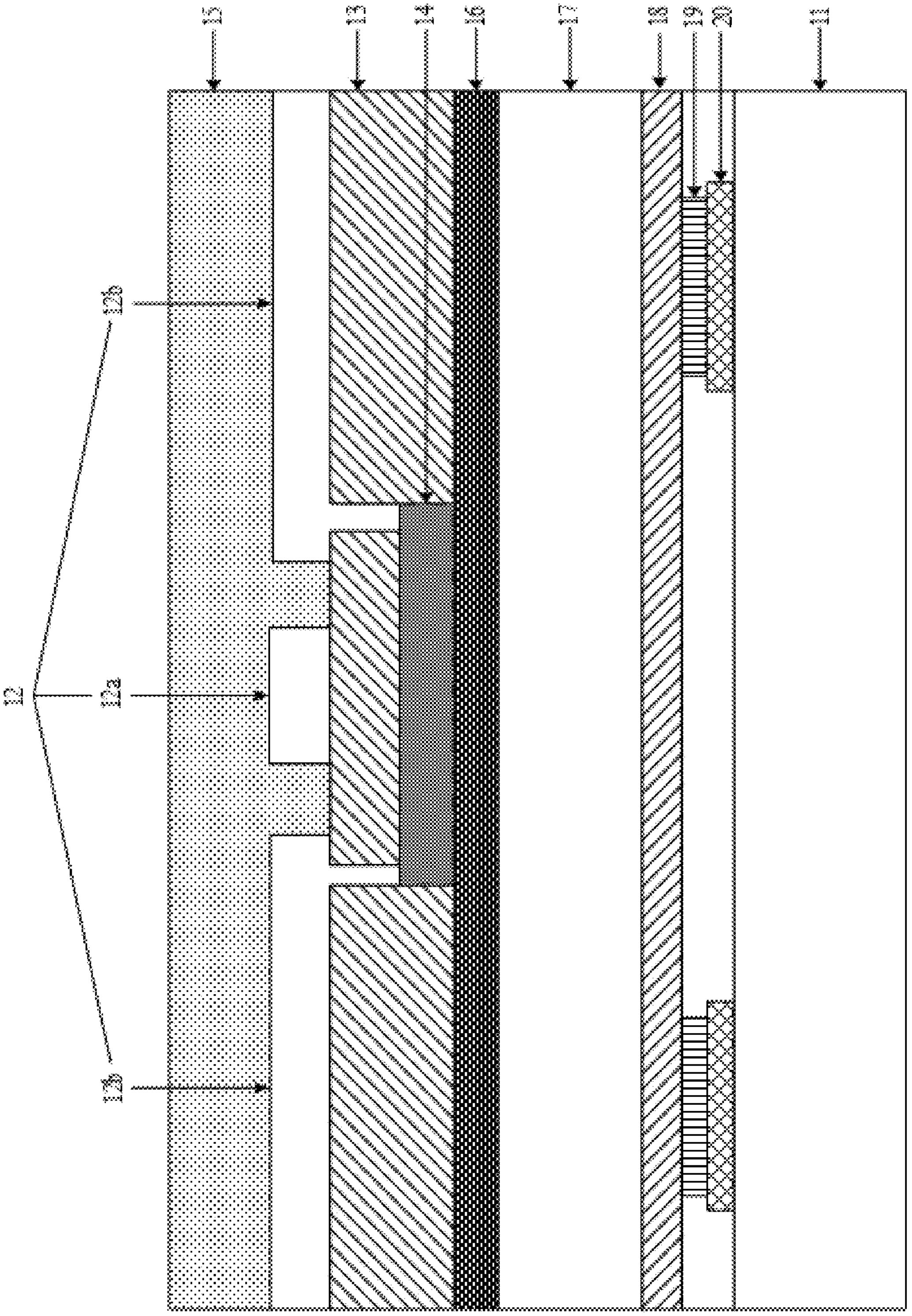
FIG. 11 is a sectional view of a touch panel.

For example, FIG. 11 is a sectional view of the touch panel. The touch panel 1 includes a backplate circuit layer 11, and an anode layer 20, a light-emitting layer 19, an anode layer 18, an encapsulation layer 17, a barrier layer 16, a bridging electrode layer 14, an insulation layer 13, a touch electrode layer 12 and a protection layer 15 laminated one on another on the backplate circuit layer 11. Reference signs 12*b* and 12*a* represent the touch electrode TX and the touch electrode RX respectively, and specific positions of the touch electrode TX and the touch electrode RX will not be particularly defined herein.

For example, the first flexible circuit board may be a single-layered board or a multi-layered board, which will not be particularly defined herein.

The present disclosure further provides in some embodiments a touch display device, which includes the above-mentioned touch display module.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A touch display module, comprising:

a touch panel, a first binding region and a second binding region being arranged at two opposite ends of the touch panel in a first direction, the first binding region and the second binding region being both arranged at a backlight side of the touch panel, the touch panel comprising a plurality of first touch lines and a plurality of second touch lines, ones of the plurality of first touch lines and the plurality of second touch lines comprising a plurality of first sub-touch lines curved and extending to the first binding region and a plurality of second sub-touch lines curved and extending to the second binding region;

a touch driving circuit board, a touch Integrated Circuit (IC) being arranged on the touch driving circuit board, a plurality of first leads corresponding to the plurality of first sub-touch lines being arranged on the touch driving circuit board;

a first flexible circuit board, one end of the first flexible circuit board being bound to the second binding region, the other end of the first flexible circuit board being bound to the touch driving circuit board, a plurality of second leads corresponding to the plurality of second sub-touch lines being arranged on the first flexible circuit board so that the plurality of second sub-touch lines is coupled to the touch IC, a first compensation line being further arranged on the first flexible circuit board, the first compensation line being arranged at a side where the plurality of second leads is located in a second direction perpendicular to the first direction, the first compensation line and the second leads being arranged side by side, one end of the first compensation line being coupled to a corresponding first sub-touch line via the touch driving circuit board; and a second flexible circuit board, one end of the second flexible circuit board being bound to the touch panel via the first binding region, the other end of the second flexible circuit board being coupled to the touch driving circuit board, a third lead corresponding to each first sub-touch line being arranged on the second flexible circuit board, and each first sub-touch line being coupled to the touch IC via the third lead and the corresponding first lead on the touch driving circuit board.

2. The touch display module according to claim 1, wherein in the first direction, the plurality of first sub-touch lines comprises a first line arranged proximate to the second binding region, and the plurality of second sub-touch lines comprises a second line arranged proximate to the first binding region, and wherein the plurality of first leads comprises a first sub-lead corresponding to the first line, the plurality of second leads comprises a second sub-lead corresponding to the second line, the first compensation line is arranged proximate to the second sub-lead, and the first compensation line is coupled to the first sub-lead.

3. The touch display module according to claim 2, wherein there is a gap between the first compensation line and the second binding region.

4. The touch display module according to claim 3, wherein; in the second direction, there are at least two second binding regions spaced apart from each other, the second sub-lead comprises a first connection section, a second connection section and a third connection section, one end of the second connection section is coupled to one of the second binding regions, one end of the third connection section is coupled to one of the second binding regions, the other end of the second connection section and the other end of the third connection section are coupled to the first connection section through a via-hole, and the first connection section extends in a direction close to the touch driving circuit board; and the first compensation line at least comprises a first compensation section proximate to the first connection section.

5. The touch display module according to claim 4, wherein the first compensation line further comprises a second compensation section proximate to the second connection section, and one end of the second compensation section is coupled to the first compensation section.

6. The touch display module according to claim 5, wherein the first compensation line further comprises a third compensation section proximate to the third connection section, and one end of the second compensation section and one end of the third compensation section are coupled to the first compensation section through a via-hole.

7. The touch display module according to claim 4, wherein the first flexible circuit board is of a multi-layered board structure.

8. The touch display module according to claim 3, wherein in the second direction, there is one second binding region or a plurality of second binding regions spaced apart from each other, one end of the second sub-lead is coupled to a corresponding second binding region, the other end of the second sub-lead is coupled to the touch driving circuit board, and the second compensation line is arranged proximate to the second sub-lead.

9. The touch display module according to claim 2, wherein a spacing between the first compensation line and the second sub-lead is identical to a spacing between two adjacent second leads.

10. The touch display module according to claim 2, wherein in a direction away from the second binding region, the plurality of first sub-touch lines comprises a plurality of third lines proximate to the first line, and wherein in the second direction, at least one second compensation line is arranged in a side-by-side manner at a side of the first compensation line away from the second lead, and the at least one second compensation line is coupled to at least one of the plurality of third lines respectively.

11. The touch display module according to claim 10, wherein the touch panel comprises N first touch lines;

in the first direction, the plurality of first sub-touch lines is arranged sequentially in an order from 1 to n, the plurality of second sub-touch lines is arranged sequentially in an order from n+1 to N, and a serial number of the first line is n; and in a direction away from the second lead, an mth second compensation line is coupled to an (n−m)th third line, where m is a natural number greater than or equal to 1.

12. The touch display module according to claim 10, wherein a spacing between the second compensation line and the first compensation line is identical to a spacing between two adjacent second leads, and in a case that there are at least two second compensation lines, a spacing between two adjacent second compensation lines is identical to the spacing between two adjacent second leads.

13. The touch display module according to claim 1, wherein:

a fourth lead coupled to the other of the first touch line and the second touch line is further arranged on the first flexible circuit board, and the fourth lead and the second lead are arranged side by side;

in the second direction, a first signal line and a second signal line are arranged at two opposite sides of the second lead respectively, the first signal line is arranged at a side of the first compensation line away from the second lead, the first signal line is configured to receive a shielding signal, and the second signal line is grounded; and in the second direction, the first signal line and the second signal line are arranged at two opposite sides of the fourth lead respectively.

14. The touch display module according to claim 13, wherein the second signal line is shared between the second lead and the fourth lead.

15. The touch display module according to claim 1, wherein the first touch line is a driver electrode line, and the second touch line is a sensor electrode line.

16. The touch display module according to claim 1, wherein the first flexible circuit board is coupled to the touch driving circuit board via an adapter.

17. A touch display device, comprising the touch display module according to claim 1.

18. A touch display module, comprising:

a touch panel, a first binding region and a second binding region being arranged at two opposite ends of the touch panel in a first direction, the first binding region and the second binding region being both arranged at a light-exiting side of the touch panel, the touch panel comprising a plurality of first touch lines and a plurality of second touch lines, ones of the plurality of first touch lines and the plurality of second touch lines comprising a plurality of first sub-touch lines extending to the first binding region and a plurality of second sub-touch lines extending to the second binding region;

a touch driving circuit board, a touch Integrated Circuit (IC) being arranged on the touch driving circuit board, a plurality of first leads corresponding to the plurality of first sub-touch lines being arranged on the touch driving circuit board;

a first flexible circuit board, one end of the first flexible circuit board being bound to the second binding region, the other end of the first flexible circuit board being bound to the touch driving circuit board, a plurality of second leads corresponding to the plurality of second sub-touch lines being arranged on the first flexible circuit board so that the plurality of second sub-touch lines is coupled to the touch IC, a first compensation line being further arranged on the first flexible circuit board, the first compensation line being arranged at a side where the plurality of second leads is located in a second direction perpendicular to the first direction, the first compensation line and the second leads being arranged side by side, one end of the first compensation line being coupled to a corresponding first sub-touch line via the touch driving circuit board; and a second flexible circuit board, one end of the second flexible circuit board being bound to the touch panel via the first binding region, the other end of the second flexible circuit board being coupled to the touch driving circuit board, a third lead corresponding to each first sub-touch line being arranged on the second flexible circuit board, and each first sub-touch line being coupled to the touch IC via the third lead and the corresponding first lead on the touch driving circuit board.

19. The touch display module according to claim 18, wherein in the first direction, the plurality of first sub-touch lines comprises a first line arranged proximate to the second binding region, and the plurality of second sub-touch lines comprises a second line arranged proximate to the first binding region, and wherein the plurality of first leads comprises a first sub-lead corresponding to the first line, the plurality of second leads comprises a second sub-lead corresponding to the second line, the first compensation line is arranged proximate to the second sub-lead, and the first compensation line is coupled to the first sub-lead.

20. The touch display module according to claim 19, wherein there is a gap between the first compensation line and the second binding region.

* * * * *